(12) United States Patent
Benvenuti

(10) Patent No.: US 12,069,190 B2
(45) Date of Patent: Aug. 20, 2024

(54) NEURAL BLOCKCHAIN

(71) Applicant: ABCD TECHNOLOGY SARL, Nyon (CH)

(72) Inventor: Giacomo Benvenuti, Ferney Voltaire (FR)

(73) Assignee: ABCD TECHNOLOGY SARL, Nyon (CH)

( * ) Notice: Subject to any disclaimer, the term of this patent is extended or adjusted under 35 U.S.C. 154(b) by 422 days.

(21) Appl. No.: 17/293,500

(22) PCT Filed: Nov. 15, 2019

(86) PCT No.: PCT/EP2019/081468
§ 371 (c)(1),
(2) Date: May 13, 2021

(87) PCT Pub. No.: WO2020/099629
PCT Pub. Date: May 22, 2020

(65) Prior Publication Data
US 2022/0006658 A1    Jan. 6, 2022

(30) Foreign Application Priority Data
Nov. 16, 2018    (IT) .................. 102018000010379

(51) Int. Cl.
*H04L 9/32*    (2006.01)
*G06F 21/62*   (2013.01)
*H04L 9/00*    (2022.01)
*H04L 9/06*    (2006.01)

(52) U.S. Cl.
CPC .......... *H04L 9/3278* (2013.01); *H04L 9/3263* (2013.01); *G06F 21/62* (2013.01); *H04L 9/0637* (2013.01); *H04L 9/50* (2022.05)

(58) Field of Classification Search
CPC ....... H04L 9/0637; H04L 9/3263; H04L 9/50; G06F 21/62
See application file for complete search history.

(56) References Cited

U.S. PATENT DOCUMENTS

| | | | |
|---|---|---|---|
| 10,298,571 B2* | 5/2019 | Andrade | H04L 63/08 |
| 10,637,665 B1* | 4/2020 | Sundaresan | H04L 63/083 |
| 2016/0379039 A1* | 12/2016 | Dagan | H04M 1/67 382/124 |
| 2017/0046806 A1* | 2/2017 | Haldenby | H04L 9/0861 |
| 2017/0177898 A1* | 6/2017 | Dillenberger | G06F 21/6227 |

(Continued)

FOREIGN PATENT DOCUMENTS

CN    107508680 A    12/2017

OTHER PUBLICATIONS

Johng Haan, et al. "Using Blockchain to Enhance the Trustworthiness of Business Processes: A Goal-Oriented Approach", Jul. 2, 2018.

(Continued)

*Primary Examiner* — Ellen Tran
(74) *Attorney, Agent, or Firm* — Dickinson Wright PLLC; Andrew D. Dorisio

(57) ABSTRACT

The present invention is directed to a computer-implemented system for secure storage and transfer of digital data between users, based on a blockchain-like protocol, and to a computer-implemented method employing said computer system.

23 Claims, 8 Drawing Sheets

(56) References Cited

U.S. PATENT DOCUMENTS

| | | |
|---|---|---|
| 2017/0230375 A1 | 8/2017 | Kurian |
| 2017/0279801 A1* | 9/2017 | Andrade ................. G06F 21/30 |
| 2018/0025435 A1* | 1/2018 | Karame ................. G06Q 20/02 |
| | | 705/30 |
| 2018/0082296 A1* | 3/2018 | Brashers .............. G06Q 20/405 |
| 2018/0103042 A1 | 4/2018 | Castagna et al. |
| 2018/0268401 A1 | 9/2018 | Ortiz et al. |

OTHER PUBLICATIONS

Antonopoulos; "Mastering Bitcoin"; O'Reilly Media, Inc; 2010; United States.

\* cited by examiner

NEURAL BLOCKCHAIN

FIELD OF THE INVENTION

The present invention is directed to a computer-implemented system and to a computer-implemented method for secure storage and transfer of digital data of transactions between users of a network for data sharing.

BACKGROUND

Today, distributed databases based on the blockchain protocols (hereinafter simply called "blockchains", for conciseness) are employed for secure recording of transactions between two or more parties (for instance between a vendor and a buyer, between a citizen and a governmental office or a bank, etc.). Blockchain based technologies are well known in the field (see for example "Mastering Bitcoin. Unlocking Digital Crypto-Currencies." Andreas M. Antonopoulos, O'Reilly Media, 2014); briefly, they can be defined as continuously growing lists of data records (blocks), chronologically linked and secured using cryptography; typically, the recorded data are transactions.

Blockchains of the art are managed by a peer-to-peer network of users' end computing devices (nodes) adhering to a protocol for inter-node communication: addition of new blocks of data into the blockchain is controlled by the agreement between the majority of the nodes. Blockchain's integrity and legitimacy is typically assured by making the addition of deceitful blocks too costly, either from a monetary or time point of view.

The blockchain of the most prevalent technology (blockchain of Bitcoin cryptocurrency) records all the information relating to a transaction in its blocks, in unalterable way: a block is added to the blockchain only if it is authorized by the majority of the nodes of the network and the authenticity of the added block is ensured by the cryptographic functions (one-way hash functions); the calculation of the function is costly, but the verification is fast and computationally easy (e.g. in the Bitcoin cryptocurrency it is implemented by the ungoverned verification network of miners).

Current blockchain protocols have two main drawbacks: first, the verification network (miners' network) of the blockchains is highly energy demanding (today, consumption to verify and manage $1/1000^{th}$ of bank transactions for bitcoins requires Ireland energetic budget); second, everybody can apply, without a certification that validates a user identity: potentially, a huge number of accounts could be generated and controlled by the same user, thus leading to security issues.

BRIEF DESCRIPTION OF THE INVENTION

The present invention aims at solving the above problems by means of a computer-implemented system and a computer-implemented method for secured data sharing and data storing, employing a new concept of blockchain, herein called "neural blockchain" and described in details hereafter.

The invention further provides increased security for data storing and data sharing, overcoming the well-known limits of the authentication systems based on usernames and passwords, such as, among others, the need for a huge number of different and complex passwords to increase security of (personal) information and the risk that copied or cracked passwords give access to a huge amount of said information.

Moreover, the present invention allows to include objects as users of a data sharing network. Physical objects are already used to generate, store and transfer data and in the future more and more connections will be formed between objects and with their data (Internet of Things, IoT, or Internet of Everything); however, current systems for secured data sharing cannot be autonomously managed by objects due to the lack of automatically certified and trustful identity of said objects and to the lack of capacity of said objects to interact in a different way at each different transaction. The present invention is thus aimed also at solving this issue, providing unique solution to authenticate identity merging physical and digital authentication.

The present invention is directed to a computer-implemented system for secure storage and transfer of digital data between users of a network for data sharing, comprising:
  (a) a plurality of computing devices for users' access to a network for data sharing;
  (b) a digital identity associated to each user of the network and comprising an authentication means configured to automatically (i.e. without human intervention) generate a new authentication code in response to each new interrogation for identity verification;
  (c) at least one certificatory entity capable of authenticating the digital identity of users of the network;
  (d) at least one transaction between two or more users of the network, comprising digital information that is generated, owned and/or shared by at least one of said two or more users, preferably further comprising a smart contract that defines duties and rights of said two or more users on the digital information; wherein the transaction is authorized only if the digital identities of said two or more users are validated by the at least one certificatory entity;
  (e) at least one digital repository storing the digital information of the transaction and comprising a gateway for sharing said digital information, wherein access to said digital information is secured by the digital identity of the two or more users involved in the transaction: preferably only said users can have access to (at least part) of the digital information, preferably as defined in a smart contract that is part of the transaction;
  (f) one or more personal ledger databases based on a blockchain-like protocol, associated to each user of the network, preferably stored in or digitally connected to the computing device of the user, and structured so that, when a transaction between two or more users is authorized, a new block is added to the personal ledger databases associated to each of said two or more users, wherein said new block only records the digital addresses of (hyperlinks to) the digital repository(ies) storing the digital information of the transaction. Therefore, the blocks of the personal ledger database do not record the digital information of the transaction, that is only stored in the one or more digital repositories. The personal ledger database of a user then comprises a list of the digital repositories storing digital information of all the transactions involving said user, but not the digital information itself.

The invention is further directed to a computer-implemented method for secured storage and transfer of digital data between users of a network for data sharing, based on the computer-implemented system of the invention, the method comprising:
  a) accession of users, by a computing device, to the network for data sharing;

b) submission to a certificatory entity of a transaction between two or more users of the network;
c) authentication by the certificatory entity of the digital identities of said users involved in the transaction and issuance of an electronic certificate to the computing devices of the user(s) whose digital identity is validated;
d) authorization of the transaction;
e) execution of the transaction and storage of the digital information of the transaction into one or more digital repositories;
f) addition of a new block to the personal(s) ledger(s) databases associated to each of the users involved in the transaction, said new block recording the digital addresses of the one or more digital repositories where the digital information of the transaction is stored.

BRIEF DESCRIPTION OF FIGURES

Preferred embodiments of the present invention will now be described, with reference to the accompanying drawings, in which:

FIG. 2 (FIG. 2) is an overview of elements of the computer-implemented system interacting in the method of the invention, wherein: (FIG. 2A) a transaction between two users (103-1 and 103-2) is submitted to the network (101) by a first one of said two users (103-1) and a request for authorization of the transaction is sent to a certificatory entity (105), the certificatory entity (105) thus interrogating the authentication means (114-1 and 114-2) of said two users; (FIG. 2B) the transaction is authorized by authentication of the two users' digital identity (104-1 and 104-2) by the certificatory entity (105), through their authentication means (114-1 and 114-2), and an electronic certificate (113-1 and 113-2) is issued to each validated users' (102'-1 and 102'-2) computing device (103);

DETAILED DESCRIPTION OF THE INVENTION

Figure 1:
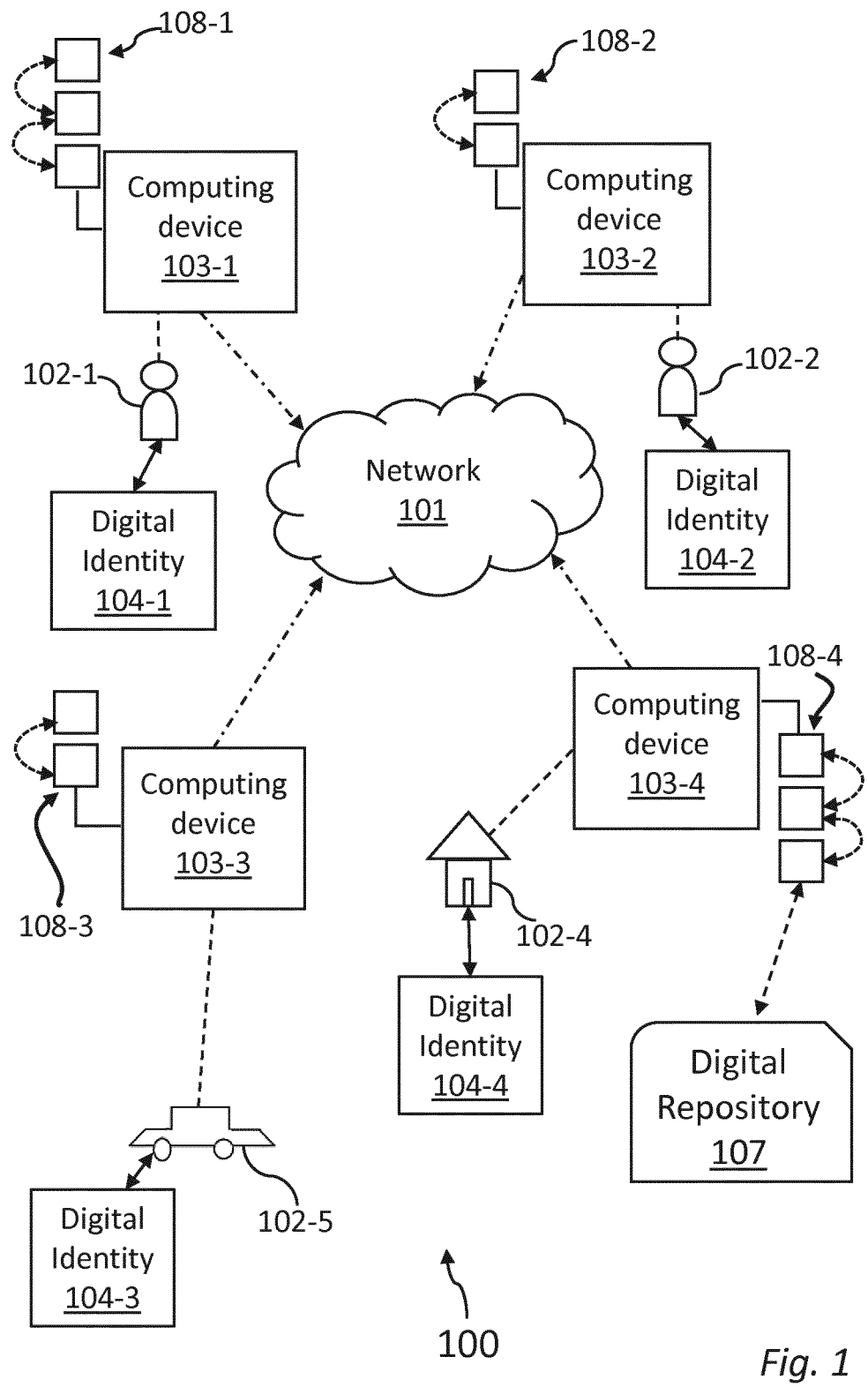
FIG. 1 (FIG. 1) is an overview of the elements of the computer-implemented system (100) according to the invention and of their connections.

According to the invention, the network for data sharing (101) can have any communications network topology and/or arrangement; preferably the network is the internet.

The elements of the computer-implemented system (100) are each other connected through any suitable hardwired and/or wireless means, being capable of communicating and transmitting digital data to each other and over the network; preferably, the elements of the system (100) are connected through wireless means.

A "User" as defined herein is a subject accessing the network for data sharing (101) through a computing device (103). For instance, a user can be a person using a computing device, or it can be an object comprising a computing device (connected to or embedded into said object). In preferred embodiments of the invention, at least one of the users of the network is an object comprising a computing device, preferably an object with artificial intelligence.

According to the invention, each user of the network has a physical and a digital (phygital) identity (104), by means of which said user is univocally identifiable; according to the invention, each user is therefore bijectively associated to a digital identity, that is specific to each user.

The term "bijectively" means that a one-to-one correspondence occurs; for instance, when referred to a user and its digital identity, it is meant that for said user one and only one digital identity exists and that each specific digital identity identifies one and only one user.

The "digital identity" (104) of a user is characterized in that it comprises an authentication means (114) for univocally authenticating the user's identity.

The "authentication means" (114) is any means capable of generating and transmitting an authentication code (such as, without limitation, a key or a password) to be verified for validating identity of the user.

The authentication means (114) can be a library of digital and/or analogic values, and the authentication code can be composed of a random string of a subset of said digital and/or analogic values. According to the invention, said authentication code is verified by a certificatory entity (105): in response to each new interrogation by the certificatory entity (105), a new authentication code (different from any precedent authentication code generated by the authentication means) is generated by the authentication means (114).

Preferably, the digital identity (104) of a user (102) includes a public user name.

Optionally, the digital identity (104) of a user (102) comprises one or more avatars, all linked to the same authentication means. An "avatar" for a given user can be for instance a secondary username, used for a certain type of transaction, enabling certification through the digital identity's authentication means (114), guaranteeing privacy.

Figure 2:
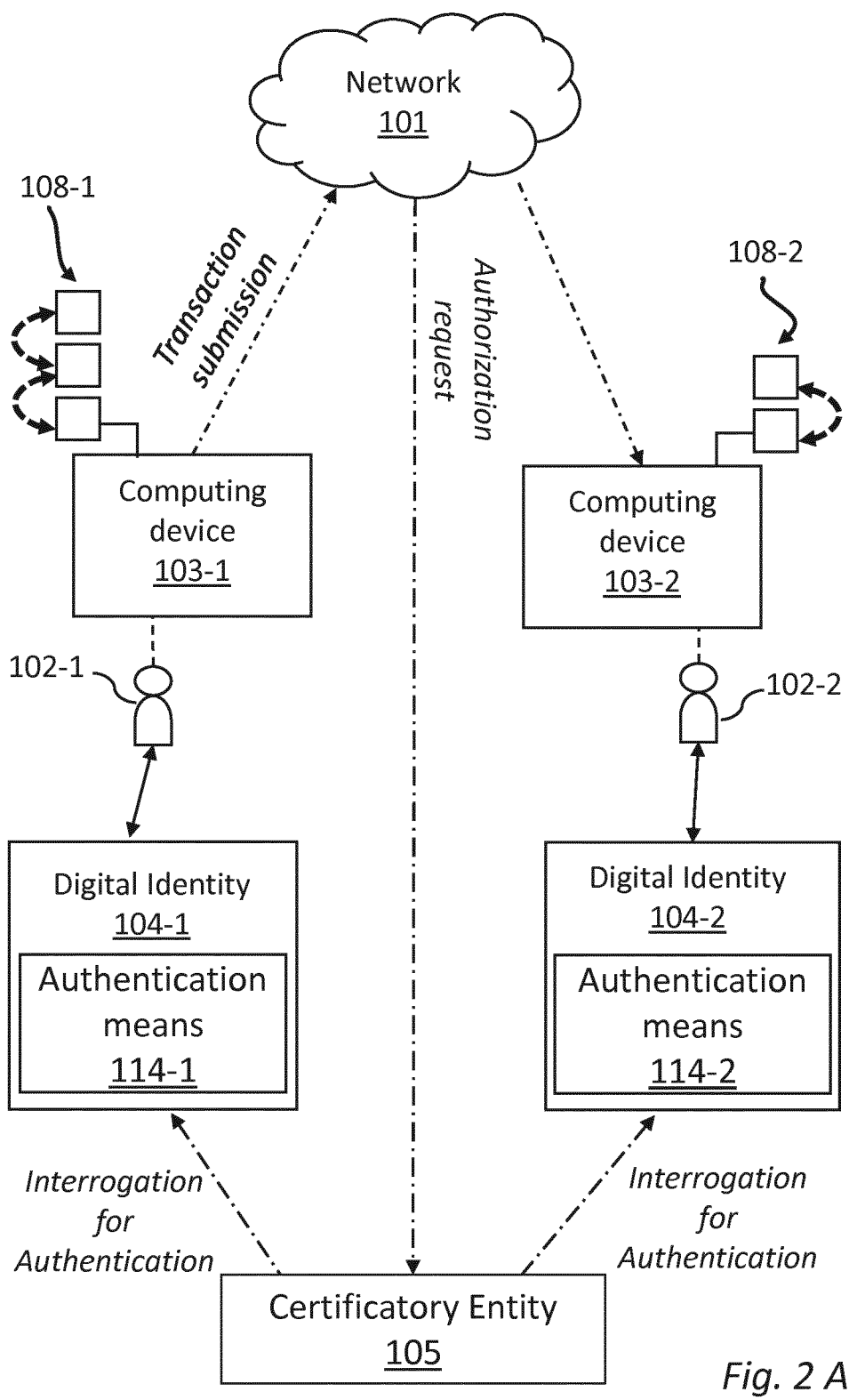
Figure 2:
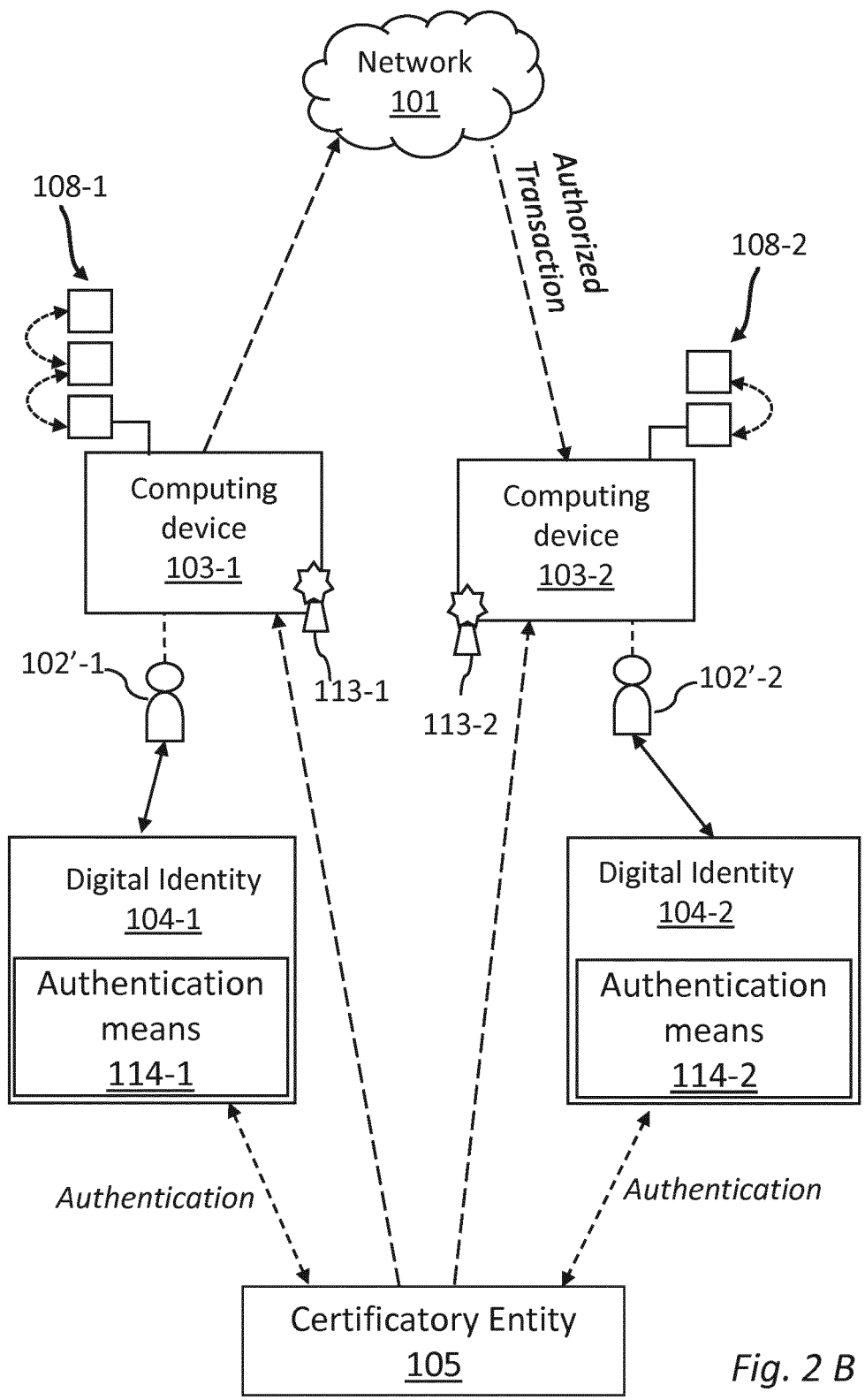

When the authentication code generated by an authentication means (114) is authenticated (validated) by a certificatory entity (105), the digital identity of the user is confirmed and an electronic certificate (113) is issued (see FIG. 2); the user is then a "validated user", whose identity (validated and certified) can be trusted.

A "transaction" (106) between two or more users (102) of the network (101) comprises the digital information generated, owned and/or shared by at least one of the two or more users.

For instance, a transaction comprises or consists in sharing of said digital information between two or more users.

"Digital information" in the context of the present invention can be (raw or elaborated) data, a software program, a smart contract, or a way to express/represent values (such as bitcoins or other cryptocurrencies without being exhaustive).

According to the present invention, a transaction (106) is authorized only if the digital identities (104) of said two or more users (102) are validated.

Therefore, differently from the databases based on blockchain protocols of the art, where a transaction is authorized by consent of the verification network (e.g. the proof-of-work method for Bitcoin cryptocurrency exchanges), transactions (106) in the computer-implemented system (100) of the invention are authorized by verification of the digital identities (104) of the users (102) involved in the transaction, through authentication of the authentication means (114) of their digital identity by a certificatory entity (105). Preferably, the transaction authorization is transmitted to the network.

As a mere example, a certificatory entity (105) can be a bank or government that authorizes a transaction (106) between two validated users (102'), where a good is sold/bought.

Preferably, the computer-implemented system (100) comprises several certificatory entities (105), wherein each certificatory entity is configured to authorize a specific type of transaction.

Optionally, the certificatory entity (105) can be itself a user (102) of the network (101), involved in a given transaction (106): as an example, when a transaction (106-1) includes sale/buying a good between two users (102-1 and 102-2), the certificatory entity (105-1) that authorizes said transaction (106-1) can itself be involved in a further transaction (106-2) with said two users, for instance for the payment of taxes on said or other good's sale/buying: in this case a further certificatory entity (105-2) may authenticate the digital identity (104-1) of the first certificatory entity (105-1) involved in the further transaction (106-2) as a user.

Figure 3:
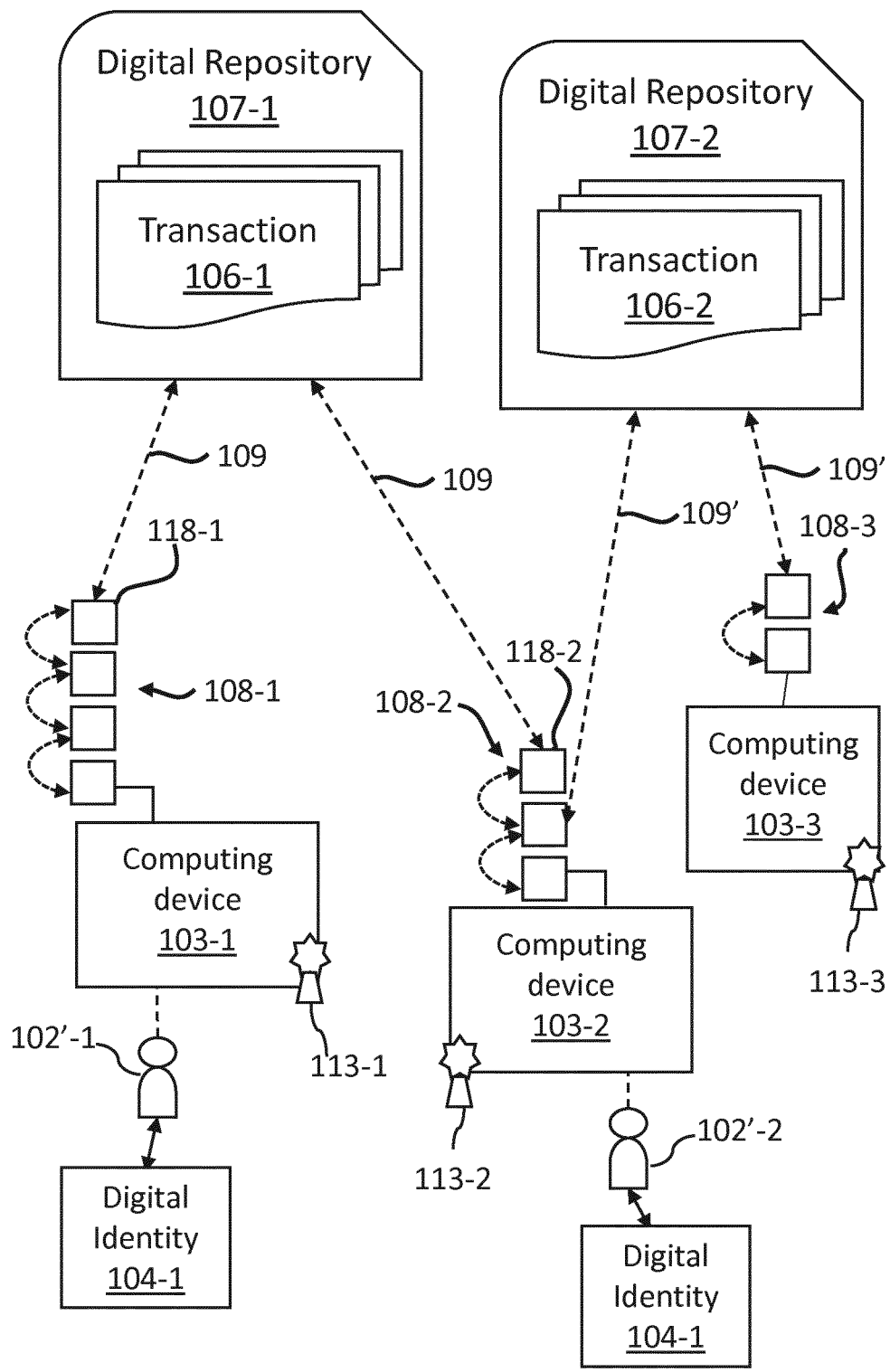
FIG. 3 (FIG. 3) is an overview of elements of the computer-implemented system interacting in the method of the invention, wherein the new blocks (118), added to the personal ledger databases (108-1 and 108-2) of a first and second validated users (102'-1 and 102'-2) involved in a transaction (106-1), both comprise a link (e.g. a hyperlink) (109) to the digital repository (107-1) that stores the digital information of said transaction (106-1); the personal ledger database (108-2) of the second user is shown to also include a chronologically precedent block that comprises a second link (109') to a second digital repository (106-2) storing the digital information of a second transaction (106-2) between said second user (102'-2) and a third user (not shown); the same second hyperlink (109') being thus recorded in a block of the personal ledger database (108-3) of said third user.

According to the invention, the digital information of a transaction (106) is stored in at least one digital repository (107) (see FIG. 3).

A "digital repository" (107) is any medium or digital system capable of storing digital information. Examples of suitable digital repositories are: a hard disk, a cloud, a fog, a USB key, etc. A digital repository can be connected to other digital repositories through the network for data sharing, such as Internet.

In a preferred embodiment, the digital repository (107) that stores digital information of a transaction between two or more users (102) is secured by the digital identities (104) of said two or more user (102), so that only validated users (102') involved in the transaction (106) can access the one or more digital repositories (107) that store the digital information of said transaction (106).

Having access to the digital information stored in one or more digital repositories (107), the validated users (102') involved in a transaction (106) are able to read said information; preferably the validated users (102') cannot modify the digital information.

Preferably, the certificatory entity (105) that authenticates a digital identity of a user, and that is not a user of the transaction, has no access to the digital information generated, owned or shared by said user.

Optionally, the digital information of a transaction can be stored in a fog database (e.g. instead of a cloud database or of a local storage medium), so that different parts of the digital information are stored in different digital repositories.

Preferably, the digital information of a transaction is distributed in several digital repositories, possibly in one different repository for each user involved in the transaction.

Optionally, the transaction comprises or consists in a Smart Contract, that defines duties and rights of the involved users on the transaction's digital information. For instance, a smart contract can define what user has access to which digital information of the transaction. The users (102) of the transaction (106) may thus have access only to one or to several digital repositories (107) storing the digital information, but not to all, having thus access only to a portion of said digital information, as defined in the Smart Contract. Pre-defined Smart Contracts templates can be used to define rights and duties of the users.

Access to the digital information can be either public or private as defined for example in the smart contract.

The digital address of the digital repositories (107) that store at least part of the information of a transaction (106) is recorded in the blocks of the personal ledger databases (108) associated to each user of the transaction (see FIG. 3), preferably in the form of a hyperlink or in any other suitable form that can create a connection to the digital repository.

The personal ledger databases (108) of the computer-implemented system (100) of the invention are based on a "blockchain-like" protocol, since they share some, but not all, of the typical features of a blockchain: personal ledger databases (108) according to the invention are indeed a growing list of blocks that include a cryptographic key (e.g. a hash function), that links each new block to the previous one, and a timestamp. However, they differ from typical blockchains of the art at least in that the blocks do not record the digital information of a transaction (106), but only the address of the repositories (107) that store said information, and in that addition of new blocks (118) is not managed by a peer-to-peer network of nodes, but by validation of the digital identities (104) of the users by a certificatory entity (105), as described above.

Figure 5:
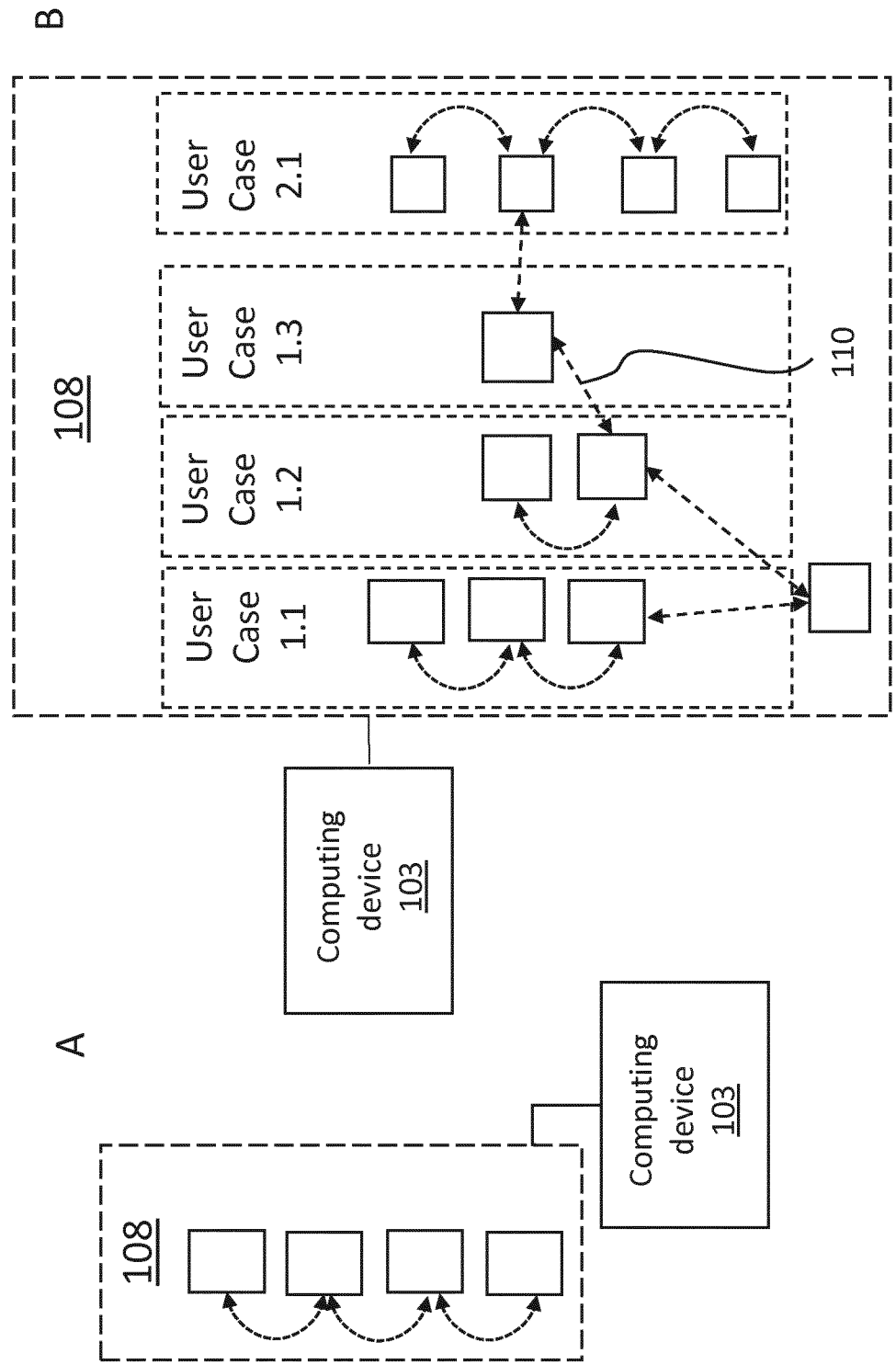
FIG. 5 (FIG. 5) shows exemplary personal ledger databases according to the invention, having (A) a linear structure when blocks are chronologically linked or (B) a tree-like structure where the blocks are (also) semantically linked, and being ramified, for instance on the basis of different user cases, or of different users' avatars, or issued from the Smart contract requiring different parallel block-chains based on different rights or different organization procedures.
Figure 6:
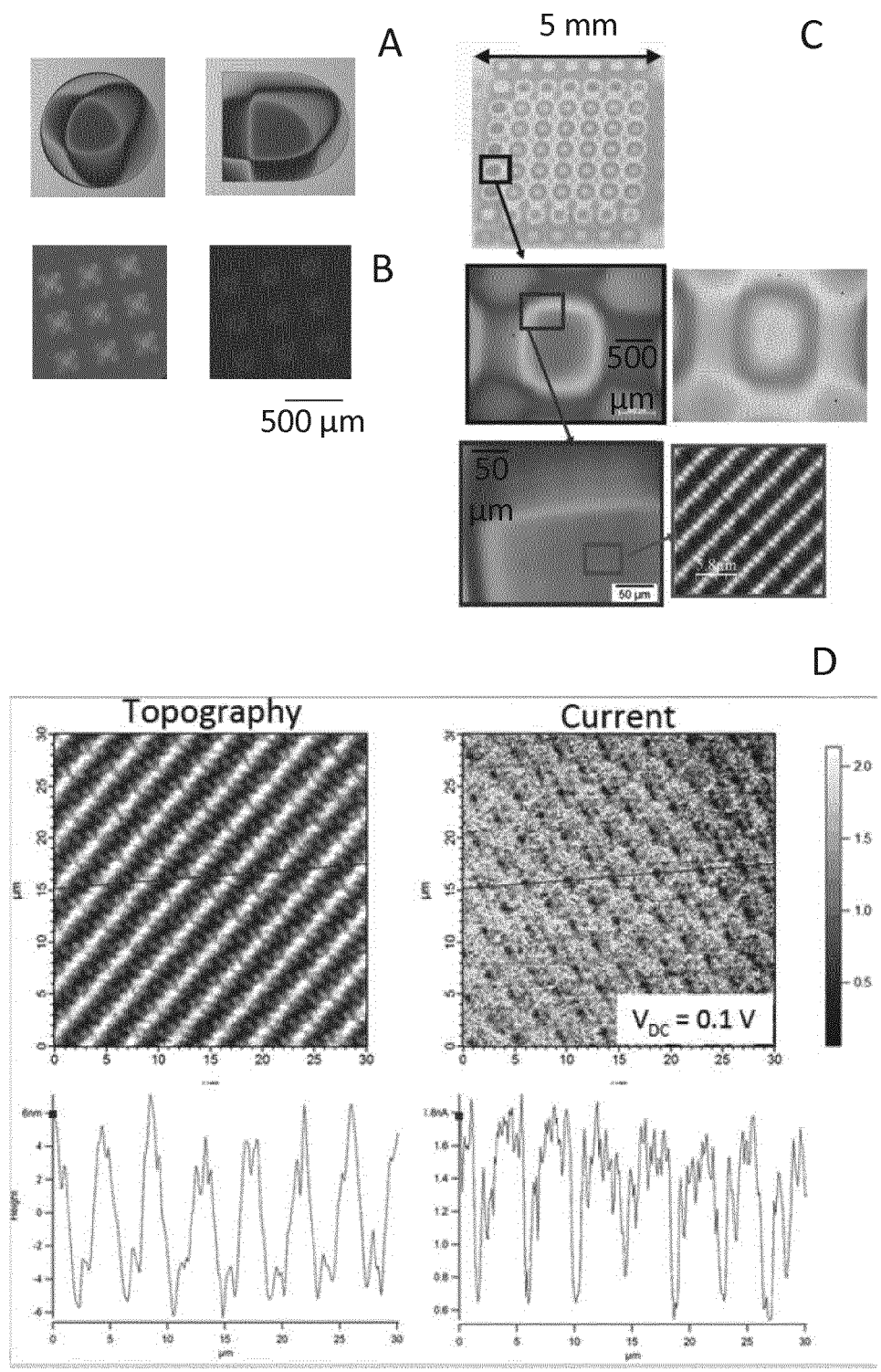
FIG. 6 (FIG. 6) shows authentication means of the fingerprint type, according to a preferred embodiment of the invention: the fingerprint can have different shapes visible to the naked eye (A), when illuminated with an optical measurement device at different wavelengths (B), or when analysed at different resolutions (C), or it can provide different values at the same points when measured with different measuring devices (D) or protocols/conditions.

Optionally, blocks of a personal ledger database (108) can be (also) semantically linked when containing a same hashtag, keyword, number, or string, optionally managed by a dedicated avatar. For instance, all the blocks of a personal ledger database (108), of the same or of different users (102), relating to bank transactions can be linked by a common hashtag (e.g. #bank), being thus all searchable by this common hashtag. As further example, all the blocks relating to money transactions of the same amount can be searchable by said amount (i.e. by a certain number). The personal ledger database (108) of a same user (102) can thus have a linear shape (see on FIG. 5A), when blocks are only chronologically linked, or they can have a tree shape (see on FIG. 5B), when blocks are (also) semantically organized.

Preferably, the personal ledger databases are private and not accessible by users not involved in the transaction and the digital information of a transaction stored in the digital repository whose address is recorded in the personal ledger database is private and accessible only by at least one of the validated users involved in the transaction.

In a preferred embodiment, a transaction (106) comprises a smart contract that includes a form reporting the data of users involved in the transaction, and the computer-implemented system (100) is configured so that when said transaction (106) is authorized, a hashtag that identifies the type of transaction is automatically generated in the personal ledger databases (108) of said involved users.

A sidechain (also known as "child chain") is a separate blockchain that is attached to its parent (or main) blockchain using a two-way peg. The two-way peg enables interchangeability of assets at a predetermined rate between the parent blockchain and the sidechain. Sidechains have been developed to increase security and scale up of blockchains.

Clearly, a sidechains system can be easily implemented in the system of the invention. For instance, one or more sidechains can be attached to a personal ledger database of the system of the invention, being thus connected to the same digital repository(ies).

Therefore, the computer-implemented system (100) of the invention preferably further comprises one or more sidechains attached to one or more personal ledger databases (108) associated to users (102) of the network (101).

The system of the invention, where the digital information is recorded in a repository and not in the blockchain (personal ledger database) itself, avoids the risk of weakening the blockchain by attachment to a weak sidechain, which is a disadvantage of the sidechains of the art.

When a user is an object, the preferred certificatory entities can be, without limitation, the object's producer and/or the object owner.

Figure 4:
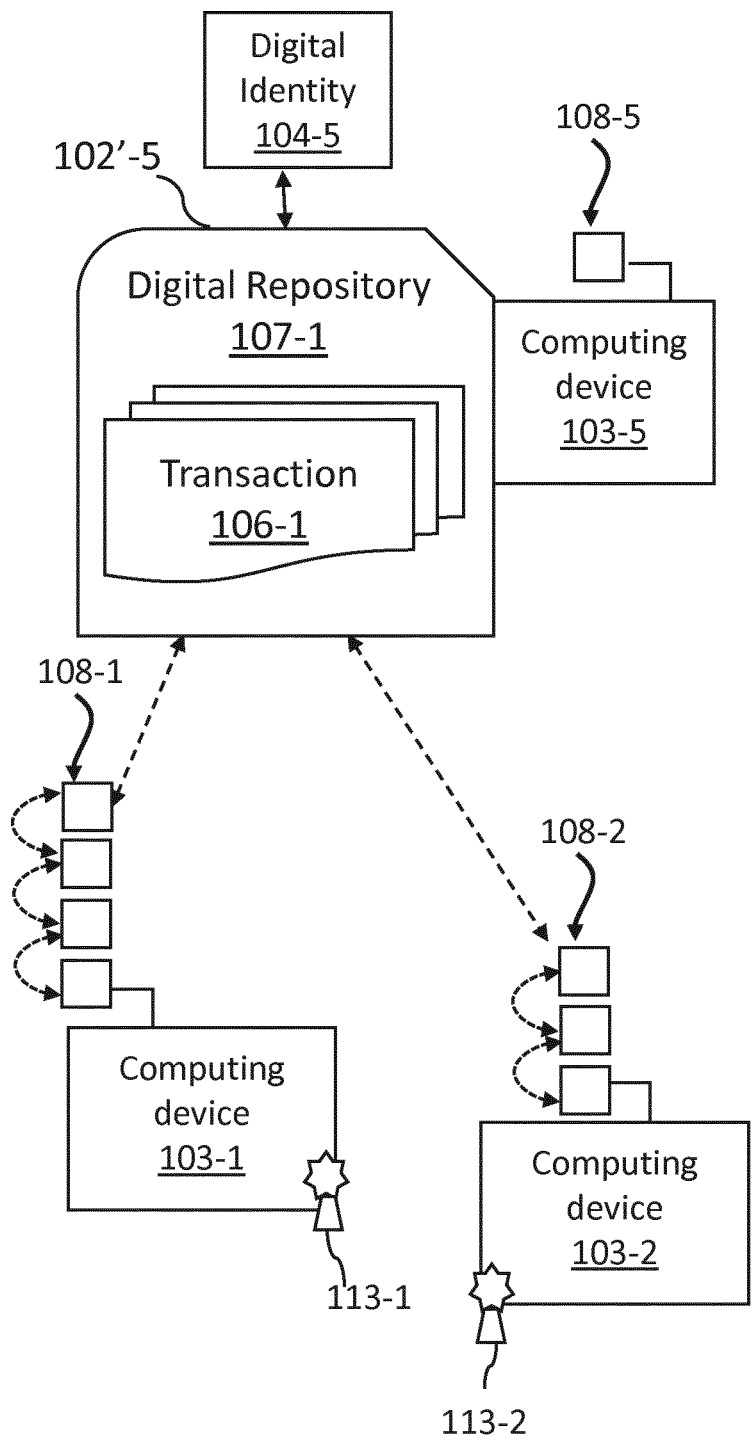
FIG. 4 (FIG. 4) shows a preferred embodiment of the invention wherein a digital repository (107-1) storing digital information of a transaction (106-1) is also a validated user (102'-5) of the network, having its own digital identity (104-5) and being the seed for a new personal ledger database (108-5), that records transactions involving said digital repository (107-1)

According to preferred embodiments of the invention, digital repositories (107) and the same certificatory entities (105) can also be users of the network (101). Preferably, when a digital repository (107-1), storing digital information of a first transaction (106-1), is a validated user (102'-5) of a further transaction, a (first or a new) block can be generated in a personal ledger database (108-5) associated to the digital repository (see on FIG. 4).

When a user of the network (101) is a digital repository (107) for remote storing of digital information, such as a cloud server, one of the certificatory entities (105) can be, without limitation, the provider of said digital repository. If a fee is due to such provider it can also be directly involved as a user in the transaction.

A digital repository (107) according to the invention can also act as certificatory entity (105), capable of authenticating the digital identity of a user.

A digital identity can be attributed also to files stored in a repository: for instance, the digital identity of a file can comprise the file name and the authentication means of the digital identity of the repository that stores the file.

According to preferred embodiments, the authentication means (114) of the computer-implemented system (100) of the invention is a token hardware or a hardware with a Physical Unclonable Function (PUF) or a SIMPL (SIMulation Possible but Laborious) pattern and hardware primitive cryptographic functionalities. In most preferred embodiments, the authentication means is a fingerprint comprising a plurality of points having measurable material properties, and further comprising a processor capable of executing a protocol that generates the authentication code by encrypting values obtained by measuring at least one of said measurable material properties at one or more points of the fingerprint by means of a measuring device.

A "measurable material property" is any analogic property that is measurable, such as any physical or chemical property, and whose measurement returns a value. For instance, the measurable material properties of a fingerprint can be optical, electrical, topographic, mechanical, thermal, magnetic, chemical properties, and combinations thereof.

The fingerprint, according to preferred embodiments of the invention, is thus a library of values obtainable by measuring one or more of its material properties at one or more points of the fingerprint; the fingerprint can generate authentication codes composed from a random string of said values. The authentication code can thus be generated by measuring material properties of a subset of points, obtaining values, randomly combining a string of said values and transposing it into a code by an algorithm. For instance, 100 to 10,000 different values can be obtained for each dot of the fingerprint.

Preferably, said fingerprint has up to about $10^6$ points (dots) per $mm^2$ having different measurable material properties, more preferably from 100 to $10^6$ points. As such, a new user authentication code (one-time key/password) can be generated at each interaction. The unique password being composed by the position of the dots used, the reading methodology and the material properties values at each of the measured dots. These values can be further scrambled by encryption software methods to enhance the complexity even further approaching the quantum computing resilient security level.

WO2015140731 discloses thin films (tags) obtained by chemical beam vapor deposition (CBVD), suitable as fingerprint authentication means according to the present invention. Said thin films can be simultaneously patterned and read at different scales to provide a wide panel of different material properties (patterns with resolution from nano- to (sub)milli-metric, ultra-covert function, see e.g. on FIG. 7); the production process disclosed in WO2015140731 allows to obtain more than $10^{20}$ different configurations in the same deposition process, thus potentially leading to more than $10^{20}$ different digital identities comprising said thin films as authentication means. With such a huge amount of complex values embedded into the film, the fingerprint provides unclonable electronic identity to users, as it is impossible to forge it, even with huge investment, without knowing the exact equipment configuration and all the process parameters used to grow the thin films. This makes it impossible to counterfeit the film by reverse engineering. By measuring and combining such a high number of measurable material properties, a huge number of different authentication codes can be generated with a single fingerprint. The authentication codes generated by the fingerprint, a new one at each interrogation, can be inserted into gateways to prevent unwanted remote access to e.g. a digital repository.

The variability of material properties as a function of stimuli, mathematical algorithms (variable firmware used as an encryption code), or different measurement devices used, provides for a very high number of possible values and combination of values obtainable with the same fingerprint. The interrogation by the certificatory entity can vary any parameter with an endless number of possible answers that are beyond what could be stored in a binary software database. The fingerprint can in this way generate a new code in response to each interrogation, said code being impossible to predict. Each transaction can thus be uniquely authenticated and certified.

Preferably, the fingerprint of the invention is a film obtained by chemical beam vapor deposition (CBVD).

Oxides, that can be deposited by CBVD process, are known to exhibit multi-functional properties (i.e. simultaneous different properties) that are easily tuned on by tiny modifications of the material composition and the deposition process. Preferred oxides employed in the CBVD process of production of the film comprise $TiO_2$ (Titania), $HfO_2$ (Hafnia), $ZrO_2$ (Zirconia), $Al_2O_3$ (Alumina), Si (Silica), ZnO (Zinc Oxide), $Ta_2O_5$ (Tantalum pentoxide), Vanadium oxides, $Nb_2O_5$ (Niobium pentoxide), $LiNbO_3$ (Lithium Niobate), $LiTaO_3$ (Tantalum Niobate).

Preferably, in the computer system of the invention the digital identity bijectively associated to each user comprises a unique fingerprint.

"Unique" referred to a fingerprint means that the fingerprint of the digital identity associated to a given user is different from the fingerprint of the digital identity associated to another user; for instance, a fingerprint is unique when it differs from other fingerprints in at least one of its measurable material properties, and/or in at least one of the values obtained by measuring one or more of its measurable material properties at a given point. For example, at a given point of coordinates x,y one or more material properties can be measured obtaining a specific value that is unique for said point/property for a given fingerprint. Moreover, combination of said values can provide a string of values that is unique for each fingerprint.

Preferably, the unique fingerprint is packaged onto a device to provide a unique identity (either a person avatar tool or an independent stand-alone device).

Preferably, the computer system further comprises at least one twin fingerprint associated to each fingerprint. A "twin fingerprint" is an identical copy of the fingerprint, whose measurable material properties are identical to the ones of the fingerprint to which the twin fingerprint is associated in every point. Preferably, the computer-implemented system of the invention comprises a single twin fingerprint for each fingerprint of each user; optionally, the computer system of the invention comprises two or more copies of a twin fingerprint.

The twin fingerprint, according to preferred embodiments of the invention, comprises a processor capable of communicating with the fingerprint to which it is associated and of decrypting the authentication code generated by the user's fingerprint. Each twin fingerprint is preferably capable of communicating with the fingerprint to which it is associated with a unique language, based on the unique encryption of values specific to each fingerprint and decryption by the twin fingerprint.

Preferably, the computer-implemented system of the invention comprises multiple twin fingerprints for each fingerprint, in order to have a back-up and/or to increase resilience and accuracy in reading/measuring the properties of the fingerprint, or avoid over-exposure of a single server to massive interrogation.

In preferred embodiments of the invention, the certificatory entity (105) is a remote central hardware-type repository, digitally connected to the fingerprint authentication means of the users' digital identities; more preferably it stores the twin fingerprints associated to said fingerprints; optionally, one or more copies of a twin fingerprint are stored in different central hardware-type repositories: an analogic non rewritable non binary-coded memories.

Optionally, a certificatory entity, storing a twin fingerprint and capable of issuing an electronic certificate of authentication when validating a fingerprint, can digitally communicate with other certificatory entities and transfer the certificate to said other certificatory entities.

Twin fingerprints can be stored in a single database, or several independent systems can regroup a lower number of fingerprints acting as a node, where different nodes are connected by the same fingerprint system and the authentication procedure is achieved by transitive property, jumping from node to node until a connection between all the various user's fingerprints is achieved.

The certificatory entity is preferably configured to execute an authentication protocol for authenticating the fingerprint that includes: interrogating the fingerprint obtaining an authentication code, decrypting said authentication code by means of the twin fingerprint, confirming authentication of the fingerprint and issuing an authentication certificate.

The fingerprint and its twin fingerprint can also be used in a book-cipher-like encrypting method, based on the library of material properties of the fingerprints, wherein two (or more) identical fingerprints (the user's fingerprint and the one or more twin fingerprint(s)) are used as "pure hardware" encryption keys.

The twin fingerprint approach provides several advantages:

The first one provides a symmetric encryption methodology without the need of a resource (hardware and energy) intensive software approach, while solving symmetric encryption keys transmission problem;

The second one avoids any kind of digital storage database that can be hacked and copied (digitalization) as the fingerprint is so complex and can provide such a high number of different keys that it cannot be simply replicated at digital level.

At least four spheres of parameters can create very complex combinations of values to generate a key:

Different dots combinations (20-50 properties extracted out of 10'000 to 1 million dots);

Non-binary encoding with potentially more than 1000 different values at the readout for each dot;

Different reading protocols generating different values: as an example, for an optical read-out, a combination of 3 different wavelengths each with 10 levels of intensity leads to 1000 available spectra, but if 100 different level intensities are achieved this goes up to 1 million different spectra; each spectrum will provide a unique set of values for the same dots;

Discretization of the continuous analogic values in a variable number of intervals: for 1000 different values there could be 1000 different ways to fix the bijective relation between the measured value and the used value in the database.

The number of combinations is hence just simply astounding and is not fixed once for all. Hence the keys are unique and cannot be copied even if the etiquette is available physically.

As a most important point, this digitally native compatible protocol does not need to be supported by any hardware on the physical etiquette themselves and the supporting hardware can be provided by an external reader itself (such as a Smartphone).

In preferred embodiments, fingerprints are packaged with (system-on-chip) or monolithically grown onto a measuring device capable of measuring said at least one measurable material property.

The fingerprints according to preferred embodiments of the invention can be further capable of encrypting and decrypting information. For instance, a fingerprint of a user's digital identity can be used as a cryptographic means enabling encryption of the digital information stored in the digital repository, whose decryption can only be performed by the twin fingerprint.

At physical level, identity proof is already available for citizens with passports and/or identities-cards. These enable to travel abroad, be authenticated by different offices or public officers (banks, notaries, etc) with well-known benefits At digital level, a universal strong user-centric identity enabling traceability and authentication of user is no longer a nice-to-have, but a must-have-tool.

1. It will enable well-regulated interactions meaning:
   a. Strong spam and ransom malware reduction;
   b. Support business/transactions/interactions/social networking without intermediary trusted platforms controlling citizen data;
   c. Support universal standards protocols.
   d. Enable Smart contracts with unprecedented functionalities.
2. Build a personal ERP (Enterprise Resource Planning) platform/database will:
   a. Avoid a divergent number of parallel digital identities;
   b. Sort, organize and manage own data easily and efficiently;
   c. Self-management of certificates enabling their fast and easy transfer between entities.
3. Allow user to have a VRM (Vendor Relation Management) tool to improve interaction with business:
   a. Enable rights attribution over personal data to third parties;
   b. Follow and check how own data are used;
   c. Get paid for own data for profit use.

Similar advantages can also be achieved for business. We can mention further advantages such as:

1. Brand protection
   a. Trademarks will be very easy to manage and check at all levels as a single platform (or an interface able to connect all the platforms) could be available.
2. IP protection
   a. Claim priority
   b. Reduce costs by promoting interoperability and common new standards
3. More agile ERP able to connect different companies and business departments
4. Reduce intermediaries and support diploma/certificate checking
5. Reduce administrative burden
6. Keep Governance and sovereignty over own data and critical information removing intermediary parties with strong outlook over critical data.

With regards to Governments, it could provide a huge array of improvements to reduce costs and improve security of its services. We can mention among others:

1. Fight fraud and tax evasion
   a. Enable digital taxes not based on flat rate
2. Manage transnational services (health for traveling citizens among others).
3. More agile voting and citizen referendum management
4. Provide more security to the citizens
   Simplify digitalization (for the elder among others) and achieve a more digitally inclusive society.

The validated users (102') involved in a given transaction (106), the digital repositories (107) storing information of said transaction (106), the blocks of the users' personal ledgers (108) that record the digital addresses of said digital repositories (107), are all linked together in the computer-implemented system of the invention. In particular, the personal ledger databases (108) of the computer-implemented system (100) of the invention are linked by what are called here "neural links": the blocks of different users' personal ledgers (108), that record the same hyperlink to at least one digital repository (107) storing the digital information of a given transaction (106) between said different users, are each other linked by what is called here an "external neural link" (109, FIG. 3). Moreover, according to preferred embodiments of the invention, the blocks of personal ledger databases of the same or different users can be semantically linked by an "internal neural link" (110) (see on FIG. 5B).

The (internal and/or external) neural links that connect the blocks of the personal ledger databases of the computer system of the invention form what is herein called a "neural blockchain".

The interconnection of the personal ledger databases of the computer system further connects all the users accessing the network for data sharing whose identity is certified. In fact, each new neural link is created only after authorization of a transaction, thus after authentication of the digital identities of the users of the transaction. In such a way each neural link contributes to strengthen the authentication protocol of involved users and the Trust of each user's personal ledger database that can be made quantitative.

Authentication of digital identities of users, according to the invention, creates independent Trust relationships between groups of users of the network involved in a transaction; the more the number of transactions between users of the network increases (and consequently the number of validated users), the more the network of trusted (validated) users grows. The system of the invention enhances security at the level of both physical and digital authentication; by merging physical and digital identity it provides a unique universal standard system of authentication, which is independent from controlling entities, but nevertheless certified by a joint partnership involving everybody, from governments, to business, down to people and objects; moreover it is accessible to everybody as soon as they have a phygital identity.

The level of Trust can also be extrapolated by subcategories (semantic approach) as a function of the number of neural links supporting a user in such subcategory.

In a preferred embodiment according to the invention, when a transaction is carried out, a Smart Contract is issued. A fixed Smart Contract template sorted between different pre-defined templates (new templates can still be generated through shared consensus and made available) can define the information that are uploaded in a digital repository. For instance, in the smart contract template there can be reported a wide range of different parameters/indicators, such as the type of contract (sale transaction for example), the previous owner (selling party), the new owner (buying party), the object (identified by a fingerprint as well), the government to which VAT or taxes are paid, owner(s) (identified by a fingerprint as well) of the digital storage in which the Smart Contract is registered, possibly various banks supporting the transaction and possibly as many users as required to secure and achieve the transaction. At financial level, the various amounts exchanged can be identified. Certificatory entities can have access to the Smart Contract information—as defined by the contract—or will be possibly just simply observing third party certifying identities, but without access to information to strengthen the transaction trust. A twin database can then create new blocks in all the pertinent personal ledgers of the various users with a "semantic"

approach (tagging) as provided by the template. For example, in the previous transaction, a block will be created in the selling party personal ledger database (accounting blockchain). No information is introduced in such a block, but an encrypted hyperlink is created pointing to the digital repository. Each repository is also totally independent from each other and the information stored inside can be accessed/modified only by the generation of a new code by the corresponding fingerprint if the user has been allowed to do so. Modification of the information could be preferentially dealt with by the generation of a new block using the first repository as the root/seed of such a new ledger database. Different parallel ledger databases can be issued for each indicator in the Smart contract and organized by semantic or other rules introduced in the Smart Contract.

Figure 7:
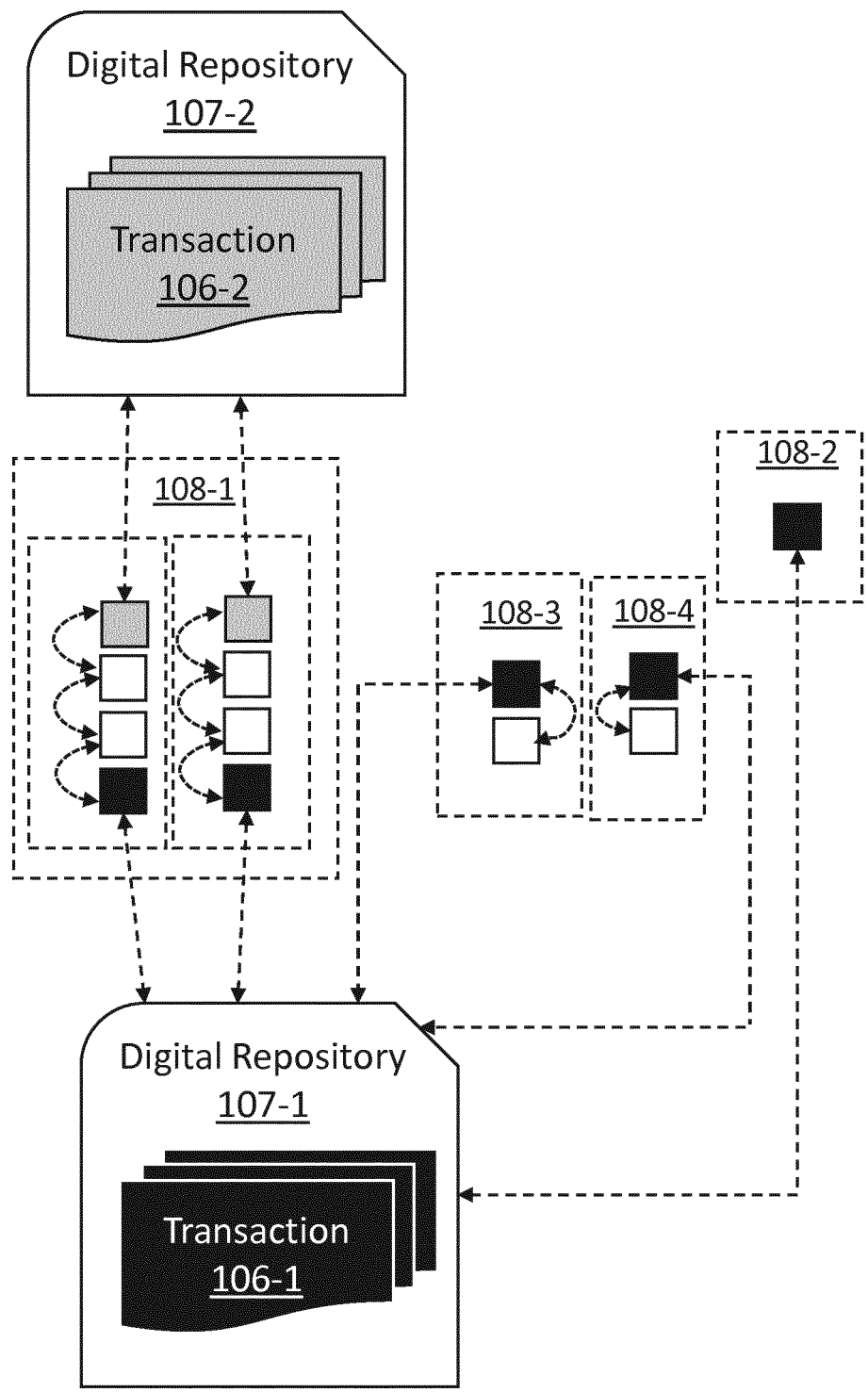
FIG. 7 (FIG. 7) shows the transactions of example 4.

A personal ledger database can receive block creation instruction by whatever Smart contract on which it is involved once authentication is validated and will thus be connected to many different digital repositories according to the previously disclosed protocol in a totally automatized way (see FIG. 7).

The computer system of the invention allows to connect different verticals and creates a third-generation web, whose content is completely traceable and certified by its own users without any governance provided by a restrained number of controlling certificating authorities (the certificatory entities). The computer-implemented system of the invention (100) is such that the connections between its elements can form a network for data sharing (101) that is the Internet of Things or Internet of Everything.

Moreover, the personal ledger databases of the invention provide a record of transactions that requires much less storage room compared to typical blockchains, since they record only the addresses of the digital repositories actually storing the digital information. Preferably, the digital repositories are generated in a small number, mainly for back-up purposes.

For example, in case the personal ledger database of a user was disrupted, the digital repositories could build a new copy rapidly and independently. In such an aspect, the neural blockchain is highly resilient to hacking even in a stand-alone process and each single block is acting as an independent entity (has to be hacked individually to gain access to the information).

Preferably, if very critical information is created, several fake digital repositories can be created in parallel to the original one, such that even if one is cracked no certitude about the content can be achieved.

The present invention can sort, organize and certify the huge amount of information that it is faced nowadays, with fast and agile protocols filtering Big Data and transforming them in something easier to manage.

Non-limiting examples of the computer-implemented system and method, according to preferred embodiments of the invention, are provided hereafter.

EXAMPLES

Example 1

In an exemplary embodiment of the invention, the digital identity (104) of a first user (102-1) comprises a fingerprint authentication means (114) having, among others, optical material properties.

Said fingerprint (114) is monolithically grown directly onto a CMOS sensor (ASIC) that acts as measurement device.

When illuminated by LEDs of different wavelengths, the fingerprint provides iridescent colours with different reflectivity. The CMOS sensor reads out data from the fingerprint illuminated at different wavelengths of light and associates the measurements to values in an alpha table. A string of at least 10-20 values is extracted randomly from the fingerprint, thus providing an authentication code, that can be validated by a certificatory entity.

Example 2

A transaction (106) between two users (102) is submitted to the network (101) for data sharing through the computing devices (103) of said users. The digital identity (104) of the two users is verified by a certificatory entity (105) comparing the authentication codes generated by the fingerprints of said two users with the authentication code provided by the respective twin fingerprints stored by the certificatory entity, read in the same way. By successful authentication of the fingerprints, an electronic certificate (113) is issued to the computing device (103) of each validated user (102') and the transaction is authorized and executed. Digital information relating to the transaction is then stored in at least one digital repository (107), while a new block (118) is added to the personal ledger databases (108) of each of the two validated users (102'), recording the digital address of said at least one digital repository (107).

Neural links (109) is thus created between the digital repository (107) and the personal ledger databases (108) of the two users.

Stored digital information of the transaction is accessible only by said two users after validation of their digital identities at each new connection to the digital repository (107).

Example 3

A user's fingerprint and its twin fingerprint, according to preferred embodiments of the invention, are used in a book cipher-like method of encrypting information, as follows. The user's fingerprint is interrogated for authentication by illuminating the same with a first wavelength w1 at a given point of the fingerprint at coordinates x,y. Light intensity emitted by the fingerprint at said position is measured by a measurement device and a value is obtained (x, y, I1); by associating to said value an alphanumeric character, a message (x, y, #) is encrypted. A second wavelength w2 is used to shine the same fingerprint on the same position and a second value of light intensity is measured (x, y, I2) obtaining an authentication code (x, y, I2). The authentication code is transferred to the processor of a hardware-type repository storing the twin fingerprint. Wavelength w2 is used to illuminate the twin fingerprint on the same (x, y) position, authenticating the authentication code (x, y, I2), then the first wavelength w1 is used to illuminate the twin fingerprint at (x, y) position, obtaining the value (x, y, I1) and decrypting the message (x, y, #).

A similar effect can be obtained by illuminating with a single wavelength two fingerprints at the same point, while modifying their material properties by applying an external stimulation (i.e. electric field for opto-electric materials).

A similar effect can also be obtained by applying stimuli (electrical, magnetic, etc. . . . ) in different conditions to achieve a different response from the fingerprint.

Example 4

FIG. 7 shows the following working example.

A first sale (Transaction) is realized, involving the following users: a selling party, a buying party, a vendor/distributor, and the government (the latter for the VAT payment on the sale). Optionally, also the object of the transaction can be itself involved as a user, as long as it owns its digital identity.

A Smart Contract is established between all the users.

A digital repository (107-1) is built where all the information (106-1) related to the sale is stored. The access reading, modifying, etc. . . . ) to the data is available, according to the rights negotiated between the users. The selling party needs internally to receive two different information, therefore a double right is attributed to the selling party. For each right, a new block is created in the users' personal ledgers (respectively: 108-1 for the selling party, 108-2 for the buying party, 108-3 for the vendor and 108-4 for the government), according to the Smart Contract.

In the case of the selling party, the party needs to add a block both to its accounting personal ledger (108-1*a*) and to a specific management personal ledger (108-1*b*), where information is stored to make up statistics and speed up management decision based on available information. A block is also added to the buying party, vendor and VAT accounting personal ledgers.

An encrypted link between the repository (107-1) and the blocks of the various personal ledger databases is created by the authentication protocol of the fingerprints of the user involved in the transaction. As the selling party makes up another sale (transaction 106-2), the same process is replicated with the new users involved in this new transaction. For the selling party, this adds a new block to the previous personal ledger databases (108-1*a* and -1*b*), or to different ones if specified differently in the Smart contract. The blocks of the various personal ledger databases provide a ledger of all registered transactions and a link that can be activated by fingerprint's further authentication to the various transactions.

The invention claimed is:

1. A computer-implemented system (100) for secure storage and transfer of digital data between users (102) of a network (101) for data sharing, comprising:
   (a) a plurality of users' computing devices (103) for access to a network (101) for data sharing;
   (b) a digital identity (104) associated to each user (102) of the network (101) and comprising an authentication means (114), said authentication means (114) comprising a processor capable of automatically generating an authentication code in response to an interrogation for validating the digital identity (104) of a user (102), wherein a new authentication code is generated in response to each new interrogation;
   (c) at least one certificatory entity (105) in communication with the authentication means (114) and computing devices (103) of the system (100), and comprising a processor capable of validating a user's digital identity (104) by interrogating the authentication means (114) and verifying the authentication code generated by the authentication means in response to the interrogation, and configured to issue an electronic certificate (113) to the computing devices (103) of validated users (102') whose digital identity (104) is validated;
   (d) at least one transaction (106) involving two or more users (102), authorized by validation of said two or more users' digital identities (104) by the at least one certificatory entity (105), each transaction (106) comprising digital information that is generated, owned and/or shared by at least one of said two or more validated users (102');
   (e) at least one digital repository (107) having a digital address and storing at least part of the digital information of an authorized transaction (106), said digital repository (107) comprising a gateway configured to share the digital information only with the computing devices (103) of one or more of the validated users (102') involved in the transaction (106);
   (f) a personal ledger database (108) associated to each user (102) of the network (101), stored in or in communication with the users' computing device (103), each personal ledger database (108) comprising blocks linked by a cryptographic key, and being structured so that, when a transaction (106) between two or more validated users (102') is authorized, a new block (118) is added to the personal databases (108) associated to each of said two or more validated users (102'), wherein said new block (118) records the digital addresses of the at least one digital repository (107) storing at least part of the digital information of said transaction (106), and wherein the blocks of the personal ledger database (108) do not record the digital information of the transaction, which is only stored in the one or more digital repositories.

2. The computer-implemented system (100) of claim 1, wherein the authentication means (114) of a digital identity (104) is a fingerprint comprising a plurality of points having one or more measurable material properties, the fingerprint further comprising a processor capable of generating authentication codes by encrypting values obtained by randomly measuring at least one of said measurable material properties at different points of the fingerprint by means of a measuring device.

3. The computer-implemented system (100) of claim 2, further comprising at least one twin fingerprint associated to each fingerprint (114), said twin fingerprint being an identical copy of the fingerprint (114), wherein: the twin fingerprint comprises a processor being capable of communicating with the fingerprint (114) and of decrypting the authentication code generated by the fingerprint (114); wherein the at least one certificatory entity (105) is a hardware-type repository in communication with the fingerprints (114) and storing the twin fingerprints, and being configured to execute an authentication protocol for validating a user's digital identity (104) that includes: interrogating the fingerprint (114) of a user (102) obtaining an authentication code, decrypting said authentication code by means of the twin fingerprint, confirming authenticity of the fingerprint (114), validating the user's digital identity (104), issuing an electronic certificate (113) to the computing device (103) of the validated user (102').

4. The computer-implemented system (100) of claim 2, wherein the fingerprint (114) is either a system-on-chip packaged with or it is monolithically grown onto a measuring device capable of measuring said at least one measurable material property.

5. The computer-implemented system (100) of claim 2 wherein the at least one measurable material properties of the fingerprint (114) are physical or chemical properties.

6. The computer-implemented system (100) of claim 2, wherein the fingerprint is further capable of encrypting and decrypting information.

7. The computer-implemented system (100) of claim 1 wherein the authentication means (114) is a thin film.

8. The computer-implemented system (100) of claim 1, wherein at least one user (102) of the network (101) is an object comprising a computing device (103).

9. The computer-implemented system (100) of claim 1, wherein at least one digital repository (107) and/or at least one certificatory entity (105) is also a user (102) of the network, having its digital identity (104).

10. The computer-implemented system (100) of claim 1, wherein at least one digital repository (107) or the provider of the at least one digital repository (107) is also a certificatory entity (105).

11. The computer-implemented system (100) of claim 1, wherein the digital information that is generated, owned and/or shared by at least one of said two or more validated users (102') comprises a smart contract defining duties and rights of said two or more validated users (102') on said digital information.

12. The computer-implemented system (100) of claim 1, wherein the digital identity (104) of a user (102) includes a public user name.

13. The computer-implemented system (100) of claim 1, wherein the authentication means (114) is a token hardware or a Physical Unclonable Function (PUF).

14. The computer-implemented system (100) of claim 1 further including:
(g) one or more sidechains attached to one or more personal ledger databases (108) associated to users (102) of the network (101).

15. The computer-implemented system (100) of claim 1, wherein the network for data sharing is the Internet.

16. The computer-implemented system of claim 1, wherein digital information cannot be modified by the validated users (102').

17. The computer-implemented system of claim 1, wherein the digital information of a transaction is distributed in several digital repositories.

18. The computer-implemented system of claim 1, wherein the blocks of the personal ledger database (108) are semantically linked, containing a same hashtag, keyword, number or string.

19. A computer-implemented method for secured storage and transfer of digital information between users of a network for data sharing based on the computer system (100) of claim 1, the method comprising:
i) accession of at least two users (102) to the network (101) for data sharing, by means of computing devices (103);
ii) submission of a transaction (106) between said at least two users (102) to a certificatory entity (105), said transaction (106) comprising digital information;
c) authentication of the digital identities (104) of said at least two users (102) by the at least one certificatory entity (105), obtaining at least two validated users whose digital identity (104) is confirmed;
d) issuance of an electronic certificate (113) to the validated users (102');
e) authorization of the transaction (106);
f) storage of the digital information of the authorized transaction (106) into at least one digital repository (107) having a digital address;
g) recording the digital address of the at least one digital repository (107) storing the transaction's digital information into new blocks (118) of the personal ledger databases (108) associated to each one of said validated users (102');

wherein the blocks of the personal ledger database (108) do not record the digital information of the transaction, which is only stored in the one or more digital repositories.

20. The computer-implemented method of claim 19, wherein the blocks of the personal ledger database (108) are semantically linked, containing a same hashtag, keyword, number or string.

21. The computer-implemented method of claim 19, wherein digital information cannot be modified by the validated users (102').

22. A computer-implemented system (100) for secure storage and transfer of digital data between users (102) of a network (101) for data sharing, comprising:
(a) a plurality of users' computing devices (103) for access to a network (101) for data sharing;
(b) a digital identity (104) associated to each user (102) of the network (101) and comprising an authentication means (114), said authentication means (114) comprising a processor capable of automatically generating an authentication code in response to an interrogation for validating the digital identity (104) of a user (102), wherein a new authentication code is generated in response to each new interrogation;
(c) at least one certificatory entity (105) in communication with the authentication means (114) and computing devices (103) of the system (100), and comprising a processor capable of validating a user's digital identity (104) by interrogating the authentication means (114) and verifying the authentication code generated by the authentication means in response to the interrogation, and configured to issue an electronic certificate (113) to the computing devices (103) of validated users (102') whose digital identity (104) is validated;
(d) at least one transaction (106) involving two or more users (102), authorized by validation of said two or more users' digital identities (104) by the at least one certificatory entity (105), each transaction (106) comprising digital information that is generated, owned and/or shared by at least one of said two or more validated users (102');
(e) at least one digital repository (107) having a digital address and storing at least part of the digital information of an authorized transaction (106), said digital repository (107) comprising a gateway configured to share the digital information only with the computing devices (103) of one or more of the validated users (102') involved in the transaction (106);
(f) a personal ledger database (108) associated to each user (102) of the network (101), stored in or in communication with the users' computing device (103), each personal ledger database (108) comprising blocks linked by a cryptographic key, and being structured so that, when a transaction (106) between two or more validated users (102') is authorized, a new block (118) is added to the personal databases (108) associated to each of said two or more validated users (102'), wherein said new block (118) records the digital addresses of the at least one digital repository (107) storing at least part of the digital information of said transaction (106);
wherein at least one digital repository (107) and/or at least one certificatory entity (105) is also a user (102) of the network, having its digital identity (104).

23. The computer-implemented system (100) of claim 22, wherein at least one digital repository (107) or the provider of the at least one digital repository (107) is also a certificatory entity (105).

* * * * *